L. STEINBERGER AND G. HILL.

INSULATED SUPPORT FOR ELECTRICAL CONDUCTORS.

APPLICATION FILED NOV. 26, 1920.

Reissued Jan. 18, 1921.

15,030.

Louis Steinberger
Guy Hill
INVENTORS

BY Cornelius C. Billings
their ATTORNEY

H. Lorraine

UNITED STATES PATENT OFFICE.

LOUIS STEINBERGER, OF BROOKLYN, NEW YORK, AND GUY HILL, OF WASHINGTON, DISTRICT OF COLUMBIA.

INSULATED SUPPORT FOR ELECTRICAL CONDUCTORS.

15,030. Specification of Reissued Letters Patent. Reissued Jan. 18, 1921.

Original No. 1,342,306, dated June 1, 1920, Serial No. 212,324, filed January 17, 1918. Application for reissue filed November 26, 1920. Serial No. 426,644.

*To all whom it may concern:*

Be it known that we, LOUIS STEINBERGER and GUY HILL, citizens of the United States, and residents, respectively, of the borough of Brooklyn, city and State of New York, and Washington, D. C., have jointly invented certain new and useful Improvements in Insulated Supports for Electrical Conductors, of which the following is a specification.

Our invention relates particularly to insulated inductance coils in radio apparatus.

One of the objects is to provide a mounting for the inductance coil constructed entirely of insulating material and which is rigidly and intimately secured to said inductance coil throughout the length of the coil.

Another object is to combine a mounting of insulating material with the inductance coil in such fashion as to secure the coil rigidly to the insulating material at a single molding operation.

Another object is to provide means for rigidly securing the inductance coil to a support of insulating material, the embedded portions of the volutes of the coil being separated by the insulating material.

Another object is to provide a coil of such shape that it may be readily and efficiently mounted upon the insulating support, the projecting portion having a larger cross-sectional area than that of the embedded or anchoring portion, so as to have a great amount of electrical carrying capacity.

Another object is to give the inductance coil such configuration that when one edge is embedded in the insulating material it will provide an undercut portion thereby affording a good anchorage in the insulating material, the exposed edge of the coil being at the same time also provided with an undercut portion, thereby affording a good gripping surface of the sliding contact member. Owing to the undercut portion, the sliding contact member cannot become disconnected from the exposed edge of the coil even though the apparatus be greatly jarred or shaken up from the rolling of the ship or from any cause whatever.

Another object is to fashion the anchoring portion so as to form static shields thus reducing to a minimum the effect of a brush discharge.

Other objects will appear hereinafter from the specification and claims.

Referring to the drawings, in which similar characters indicate the same parts in the several views.

Figure 1:
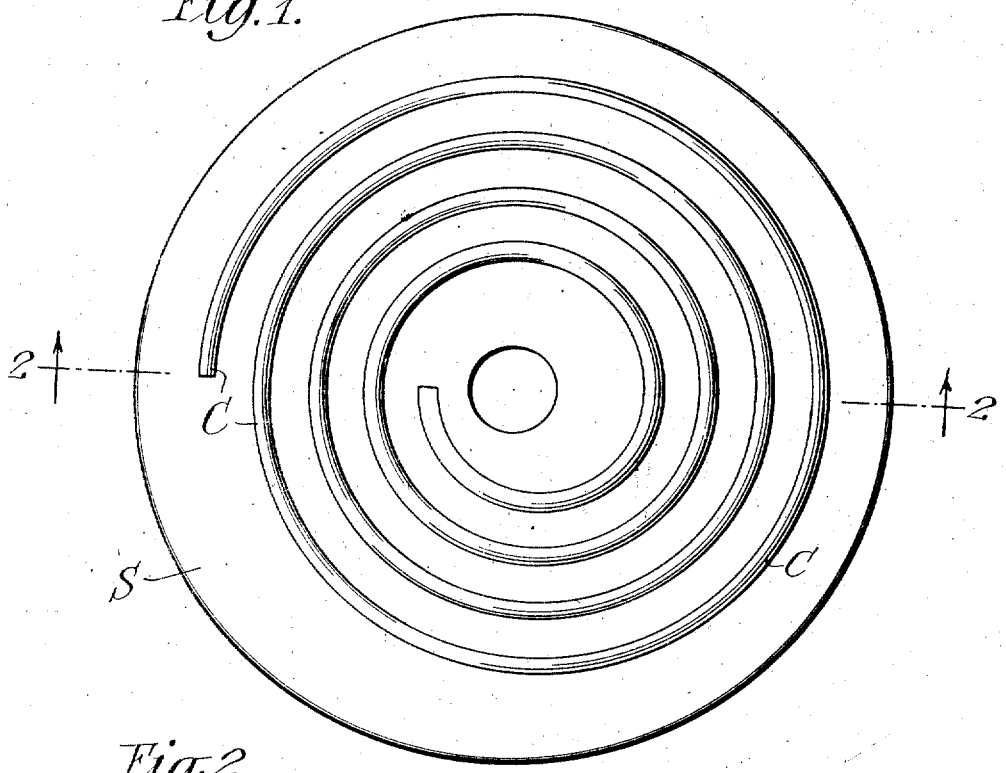
Figure 1 is a plan view of an insulating support and an inductance coil secured thereto embodying our invention.

Our invention herein shown and described may be applied to any convenient form of support, and we have shown as illustrative of the support a disk or plate S of solid insulating material.

In the embodiment of our invention the coil C is not limited to any particular form or shape of metal strip, and we have thus illustrated two shapes of strips as shown respectively at C and C′ in the several views of the drawing.

Figure 2:
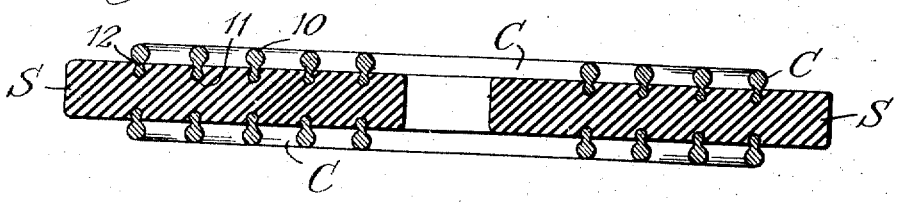
Fig. 2 is a section on line 2—2 of Fig. 1, coils being shown secured to both sides of the support.

Our invention contemplates not only the securing of the coil upon one side of the insulating plate, but also on both sides of the plate as illustrated in Fig. 2.

The insulating material used in the construction of this inventon may be of any suitable material of that nature but we prefer to use the insulating material which is known in the art as "electrose."

Figure 3:
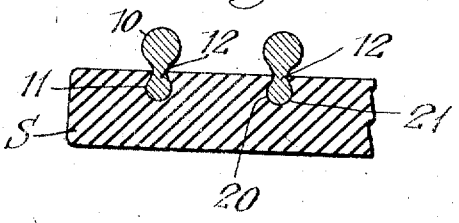
Fig. 3 is an enlarged section broken away showing the mounting of the coil in the insulating support on one side only thereof.

The strip from which the inductance coil is formed is made of metal of any suitable kind or metallic alloy. We have found that a very efficient coil may be formed, as illustrated in Figs. 2 and 3, from wire which is commonly known as "trolley wire," the cross-section of which has a figure 8 shape. In other words the upper and lower edges of the metal strip or wire are enlarged as at 10 and 11 respectively, and these enlargements are connected by a strip of metal as at 12 of less width than the metal at the edges.

This form of wire is particularly suited for our present invention because one edge 11 is so shaped as to be readily molded into the insulating material at one operation, and thereby held securely and firmly to the insulating material and the outer or exposed edge 10 is also so shaped that it may be readily clamped by a contact when the inductance coil is molded for use, as for instance, in radio apparatus. The exposed edge is also of larger cross-sectional area than the embedded or anchoring edge and thus has a maximum electrical conductivity.

The embedded edge, because of the oppositely projecting rounded edges 20 and 21, have the function and effect of a static shield because of the oppositely disposed volutes of the coil, and thus minimize the effect of a brush discharge from the metal where it enters the insulating material, that is, brush discharge between turns over the surface of the insulating material. The rounded edge also prevents brush discharge from the embedded edge of the coil.

Figure 4:
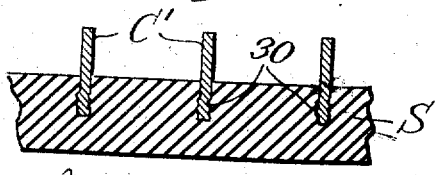
Fig. 4 is a fragmentary view partly in section showing another form of coil and means for permanently securing the coil to the insulating support.

Another form of coil and means for permanently securing the coil C′ to the insulating material is shown clearly in Fig. 4 where the sides at the lower edge of the metal ribbon or strip are provided with irregular or mutilated surfaces 30 so that in molding the coil to the insulating material the coil is permanently and securely anchored thereto.

As changes of construction could be made within the scope of our invention, it is intended that all matter contained in the above description or shown in the accompanying drawings shall be interpreted as illustrative and not in a limiting sense.

Having now described our invention, what we claim as new and desire to secure by Letters Patent is:

1. In a device of the kind described, a plate or disk supporting element of insulating material, a metal coil molded at an edge thereof to a face of the said supporting element, the cross-section of the coil having an irregular area, the insulating supporting element being co-extensive with one edge of the spiral coil.

2. In a device of the kind described, a single support of insulating material, metal coils molded at their edges to each face of the support.

3. In a device of the kind described, a support of insulating material, a metal coil consisting of a wire having a figure 8 cross section, said wire being coiled and molded in the face of said support to a depth substantially equal to the diameter of one of the enlarged portions of the metal wire.

4. In a device of the kind described, a support of insulating material, a coil of metal of a figure 8 cross section molded at one edge to a face of the insulating support to an extent that the insulating material substantially surrounds one of the curved portions of the wire.

5. In a device of the kind described, a support of insulating material, a wire of figure 8 cross section molded thereto at one edge, substantially one half of the wire being surrounded by insulating material and the other half projecting from the insulating support.

6. In a device of the kind described, a support of insulating material, a metal strip molded thereto at one edge, one of the edges having a greater area in cross section than the other edge, the edge having the greater area in cross section projecting from the surface of the insulating support and the edge of lesser cross section being molded within the surface of the support.

7. In a device of the kind described, a unitary base of insulating material, a coil consisting of a strip of metal molded throughout its length into the surface thereof at one edge, the cross section of the coil having an irregular shape, the said base being co-extensive with one edge of the coil.

8. In a device of the kind described, a unitary base of insulating material, and a spiral coil consisting of a strip of metal molded throughout its length into the surface thereof at one edge, the cross section of the coil having an irregular shape, one edge of said spiral coil being co-extensive with the unitary base.

9. In a device of the kind described, an agglomerate supporting base of insulating material, a metallic coil of figure 8 cross section embedded in said supporting base to a point of minimum cross section.

10. In a device of the kind described, an agglomerate supporting base of insulating material, a metallic coil of figure 8 cross section molded in said supporting base to a point of minimum cross section.

11. In a device of the kind described, an agglomerate supporting base of insulating material, a rolled wire coil of figure 8 cross section molded in said supporting base to a point of minimum cross section.

12. In a device of the kind described, a unitary base of insulating material, a coil consisting of a strip of metal molded throughout its length into the surface thereof at one edge, the said base being co-extensive with one edge of the coil.

In witness whereof we have hereunto set our hands at the borough of Manhattan, city and State of New York, this fifteenth day of November, 1920.

LOUIS STEINBERGER,
GUY HILL.